United States Patent
Yamazaki et al.

(10) Patent No.: US 7,151,873 B2
(45) Date of Patent: Dec. 19, 2006

(54) WAVEGUIDE TYPE OPTICAL SPLITTER AND WAVEGUIDE TYPE OPTICAL MODULE COMPRISING THE SAME

(75) Inventors: Hiroyuki Yamazaki, Tokyo (JP); Takaaki Hatanaka, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 11/404,864

(22) Filed: Apr. 17, 2006

(65) Prior Publication Data
US 2006/0210223 A1   Sep. 21, 2006

Related U.S. Application Data

(62) Division of application No. 11/081,648, filed on Mar. 17, 2005, now Pat. No. 7,103,247.

(30) Foreign Application Priority Data
Mar. 19, 2005  (JP) .............................. 2004-079480

(51) Int. Cl.
    *G02B 6/26* (2006.01)
(52) U.S. Cl. .......................................... 385/39; 385/43
(58) Field of Classification Search .................. 385/39, 385/43
    See application file for complete search history.

(56) References Cited

U.S. PATENT DOCUMENTS

| | | | |
|---|---|---|---|
| 5,546,483 A | 8/1996 | Inoue et al. | 385/14 |
| 5,745,618 A | 4/1998 | Li | 385/46 |
| 5,841,919 A | 11/1998 | Akiba et al. | 385/37 |
| 5,926,298 A | 7/1999 | Li | 385/24 |
| 5,982,960 A | 11/1999 | Akiba et al. | 385/24 |
| 6,069,990 A | 5/2000 | Okawa et al. | 385/43 |
| 6,205,273 B1 | 3/2001 | Chen | 385/37 |
| 6,526,203 B1 | 2/2003 | Gonzalez et al. | 385/37 |
| 6,697,552 B1 | 2/2004 | McGreer et al. | 385/37 |
| 6,810,167 B1 | 10/2004 | Tabuchi et al. | 385/24 |
| 6,810,180 B1 | 10/2004 | Yoneda | 385/37 |
| 6,892,004 B1 | 5/2005 | Yu | 385/39 |

FOREIGN PATENT DOCUMENTS

| | | |
|---|---|---|
| JP | 04-030108 | 2/1992 |
| JP | 406138335 A | 5/1994 |

*Primary Examiner*—Ellene E. Kim
(74) *Attorney, Agent, or Firm*—Dickstein, Shapiro, LLP.

(57) ABSTRACT

An object is to achieve both high-density output waveguides and uniformity of the losses between the output waveguides. In a waveguide type optical splitter, formed on a substrate are an input waveguide, a plurality of output waveguides, and a slab waveguide. The slab waveguide has an input end and an output end. The output end is in an arc shape with the input end or the vicinity being the center. The input waveguide is connected to the input end and a plurality of the output waveguides are connected to the output end. In the center portion of the output end, the output waveguides are directly connected to the output end. In the peripheral portion of the output end, the output waveguides are connected to the output end through the tapered waveguide whose waveguide width is widened towards the output end. Further, the opening width of the tapered waveguide becomes wider as going towards the periphery.

1 Claim, 9 Drawing Sheets

WAVEGUIDE TYPE OPTICAL SPLITTER AND WAVEGUIDE TYPE OPTICAL MODULE COMPRISING THE SAME

CROSS REFERENCE TO RELATED APPLICATIONS

This application is a Divisional of application Ser. No. 11/081,648, filed Mar. 17, 2005 is now a U.S. Pat. No. 7,103,247, of which claims priority to Japanese Patent Application No. 2004/079480 filed Mar. 19, 2005, entitled WAVEGUIDE TYPE OPTICAL SPLITTER AND WAVEGUIDE TYPE OPTICAL MODULE COMPRISING THE SAME, the entire disclosure of which is incorporated herein by reference.

BACKGROUND OF THE INVENTION

1. Field of the Invention

The present invention relates to a waveguide type optical splitter used for branching light into a plurality of rays of light in a PON system (Passive Optical Network) and the like, for example, and to a waveguide type optical module comprising the same.

2. Description of the Related Art

For building a low-cost optical communication system, it is in the process of applying the PON system to the optical communication system. The PON system makes it possible to achieve an effective usage by splitting the optical fiber using an optical splitter in an access interval. By applying the PON system to the optical communication system, it is possible to reduce the cost of the optical communication system remarkably.

The PON system uses an optical splitter module for splitting the light. A low insertion loss, a low light-dependency, and a high reliability are required for the optical splitter module. A PLC (Planar Lightwave Circuit) type optical splitter satisfies these requirements and, as a key device for the PON system, tens of thousands of them are manufactured in Japan alone.

In the PLC type optical splitter, although it is small and has a highly reliable property, there is a birefringence being generated due to a difference between a linear expansion coefficient of an Si (silicon) substrate and that of $SiO_2$ (silica glass). The birefringence influences the optical property of the optical splitter. When the waveguide of the optical splitter with the birefringence is branched in Y-shape, the branching ratio becomes dependent on the polarization. Thus, a polarization dependent loss (PDL) is generated in the branched lights. The PDL gives an influence to a power margin of the optical communication system so that it is essential to be suppressed.

The PLC type optical splitter (a first conventional example) will be described in detail by referring to FIG. 1.

Figure 1:
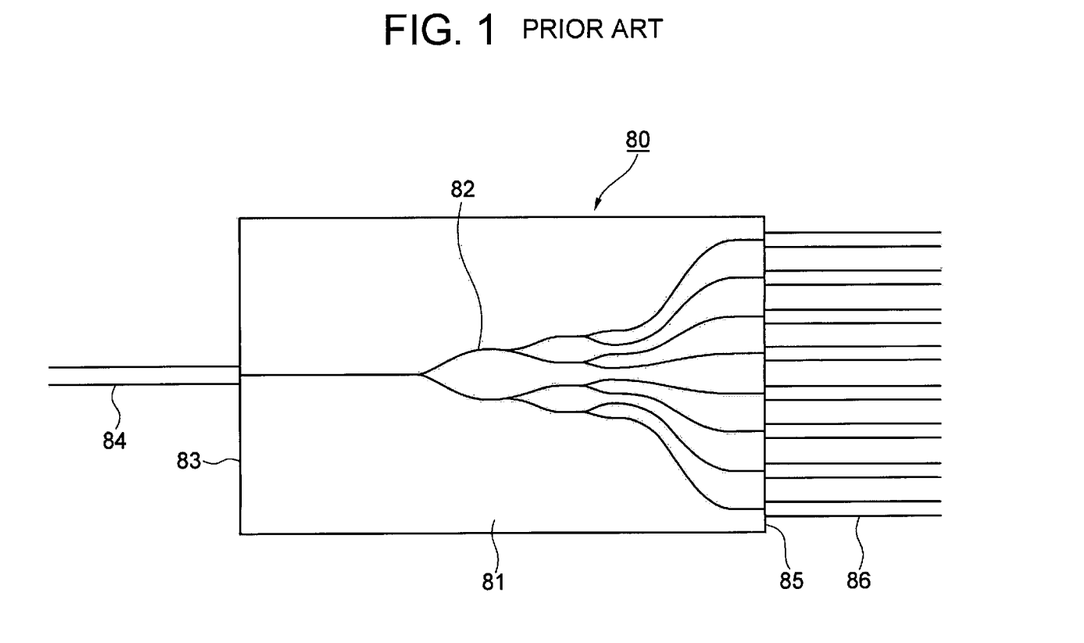
FIG. 1 is a plan view for showing a first conventional example.

As shown in FIG. 1, a PLC type splitter 80 comprises 1 x n (n is an integer of 2 or larger, for example, n=8) of waveguides 82 formed on a substrate 81. An input optical fiber 84 is connected to an input end 83 of the substrate 81 and a plurality of output optical fibers 86 are connected to an output end 85 of the substrate 81. A single waveguide 82 is simply branched into a Y-shape and a plurality of divided waveguides 82 are connected in multiple stages, thereby obtaining a plurality of the waveguides 82 in the number consistent with the number of output optical fibers 86.

However, by employing the multistage Y-branch structure in the PLC type optical splitter 80 with a large birefringence, the PDL increases cumulatively. Thus, it may not be able to meet customers' needs. Especially, the number of branches becomes large so that the cumulative PDL cannot be ignored in the multi-branch structure of 1×32, etc. Further, in the multi-branch PLC type optical splitter 80, the insertion loss is also increased due to the accumulation of excessive branch loss in the Y-branch section.

In order to achieve an excellent optical property by overcoming the shortcomings of the PLC type optical splitter 80 as described above, it is desirable to employ a so-called star coupler which branches a light signal into a plurality of light signals by a single slab waveguide. However, in the conventional star coupler, the light power of the light signal in the center becomes larger among the light power of the light signal to be branched and the light power of the light signal becomes smaller from the center portion towards the peripheral portion. Therefore, although the polarization dependency is not cumulated and an excellent polarization dependency can be obtained in the conventional star coupler since the waveguides therein are not in the multistage structure, it is an issue that the light power varies depending on the positions of the branched light signals. Japanese Patent No. 2538099 discloses a star coupler for overcoming such shortcomings.

The star coupler (a second conventional example) of Japanese Patent No. 2538099 will be described in detail by referring to FIG. 2.

Figure 2:
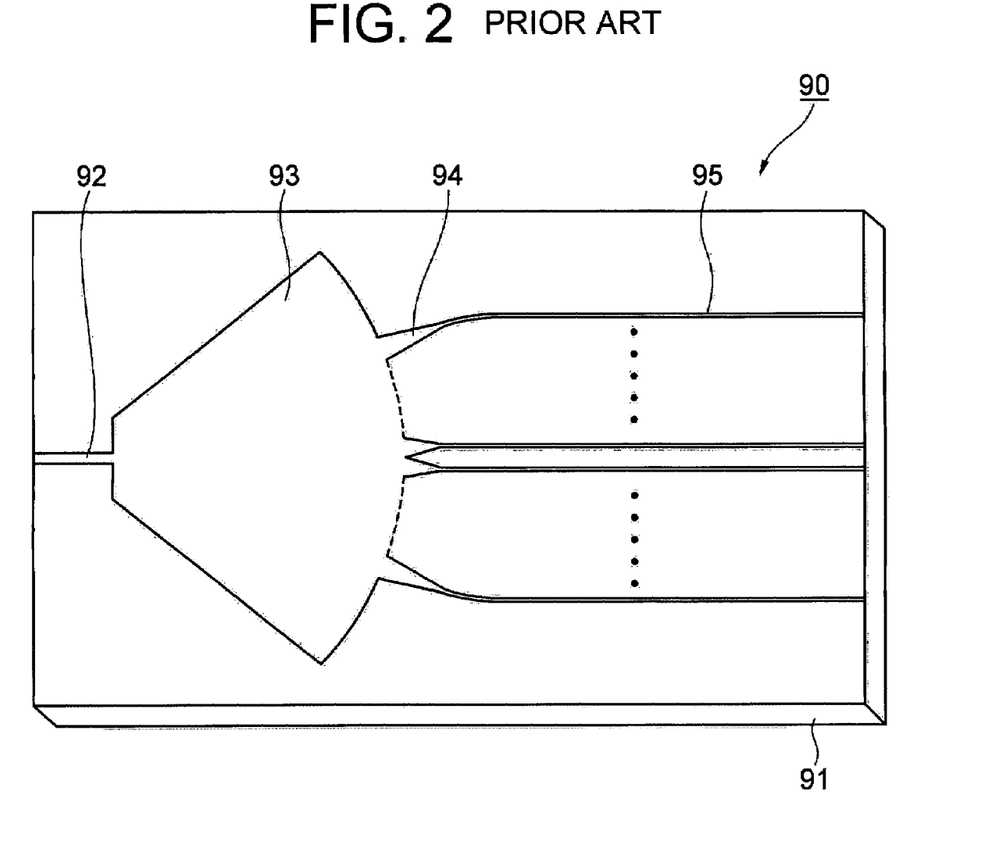
FIG. 2 is a plan view for showing a second conventional example.

As shown in FIG. 2, in a star coupler 90, disposed and connected in order on a silicon substrate 91 are an input waveguide 92, a fan-shape slab waveguide 93, a number of tapered waveguides 94, and a number of output waveguides 95. In the star coupler 90, the tapered waveguide 94 is provided respectively to all the output waveguides 95, and an opening width of each tapered waveguide 94 on the fan-shape slab waveguide 93 side is set narrower in the center where the light intensity is strong while it is wider in the peripheral portion where the light intensity is weak so as to make the intensities of the light signals branched by all of the output waveguides 95 uniform (that is, to make the loss uniform).

As shown in FIG. 2, in the star coupler 90, the tapered waveguide 94 is respectively provided to all the output waveguides 95 and the opening width of each tapered waveguide 94 is widened from the center towards the periphery. Further, as shown in FIG. 2, the output waveguides 95 positioned in the center portion with the strong light intensity comprises the tapered waveguide 94 like the output waveguide 95 positioned in the peripheral portion with the weak light strength. In addition, the opening widths of all the tapered waveguides 94 are set wider than the waveguide widths of the output waveguides 95. Further, the opening widths are widened from the center towards the periphery.

Therefore, when forming all the output waveguides 95 within the area of the substrate 91, the number of the output waveguides 95 formed on the substrate 91 is limited since there is a limit for narrowing the pitch in between the adjacent output waveguides 95. Further, when forming the required number of output waveguides 95 on the substrate 91, it is necessary to narrow the opening widths of the tapered waveguides 94 to be in the designated value or smaller. Thus, improved uniformity of the losses between a plurality of the output waveguides 95 cannot be achieved.

Actually, with the star coupler which was formed according to the conditions disclosed in Japanese Patent No. 2538099, uniformity of the losses cannot be sufficiently achieved. In the star coupler 90, as described above, it was difficult to achieve both the high-density output waveguides 95 and uniformity of the loss.

SUMMARY OF THE INVENTION

An object of the present invention is to provide a waveguide type optical splitter which can achieve both the high-density output waveguides and uniformity of the losses between the output waveguides. Further, another object of the present invention is to achieve a waveguide type optical splitter with low loss and an excellent polarization dependency by improving non-uniform light output distributions in each output port, which is a drawback in the conventional star coupler.

In order to achieve the foregoing objects, the waveguide type optical splitter according to the present invention comprises: a slab waveguide for multi-branching incident light signals; and a plurality of output waveguides being arranged in parallel with respect to the slab waveguide, to which the light signals being multi-branched are inputted, respectively, wherein opening widths of the output waveguides side to which the light signals are inputted, respectively, vary in accordance with arranged positions of a plurality of the output waveguides. The opening width is narrower in a center portion where light intensity of the slab waveguide is strong and becomes wider from the center portion towards a peripheral portion.

The light made incident from the input waveguide to the slab waveguide spreads in a fan shape with the input end or the vicinity being the center by the diffraction effect and reaches the output end. The intensities of the light reaching the output end exhibit Gaussian distribution which decreases from the center of the output end towards the periphery.

In the present invention, the opening widths of the output waveguides side to which the light signals are respectively inputted are varied in accordance with disposing positions of a plurality of the output waveguides. Specifically, the opening width is narrower in the center portion of the slab waveguide where the light intensity is strong, and is widened from the center portion towards the peripheral portion. Therefore, the pitch of a plurality of the output waveguides positioned in the center portion can be set small and the pitch of a plurality of the output waveguides in the peripheral portion can be set large. Thus, it is possible to form the required number of output waveguides on a single substrate by keeping the widths of the openings, to which the light signals are inputted, in the designated value. Moreover, since the widths of the openings to which the light signals are inputted are of the designated values, the light intensities of the light signals inputted from the slab waveguide to a plurality of the output waveguide side can be made almost uniform.

Further, when a plurality of the output waveguides positioned in the center portion and in the peripheral portion comprise the tapered waveguides, respectively, the tapered waveguides are coupled to the slab waveguide in parallel and the opening widths are widened from the center portion towards the peripheral portion. Therefore, the pitch of a plurality of the output waveguides positioned in the center can be set small and the pitch of a plurality of the output waveguides in the peripheral portion can be set large. Thus, it is possible to form the required number of output waveguides on a single substrate by keeping the widths of the openings, to which the light signals are inputted, in the designated value. Moreover, since the widths of the openings to which the light signals are inputted are of the designated values, the light intensities of the light signals inputted from the slab waveguide to a plurality of the output waveguide side can be made almost uniform. Further, a plurality of the output waveguides positioned in the center portion may be coupled directly to the slab waveguide. In this case, the pitch of a plurality of the output waveguides positioned in the center portion can also be set small and the pitch of a plurality of the output waveguides in the peripheral portion can be set large as well.

The waveguide widths of the tapered waveguides become narrower from the slab waveguide towards the output waveguide side. In this case, the waveguide widths of the tapered waveguides may be narrowed linearly. The waveguide widths of the tapered waveguides may be narrowed n-order-functionally. The waveguide widths of the tapered waveguides may be narrowed exponentially.

Further, the waveguide type optical splitter may also comprise a plurality of sub-waveguides for decreasing a transmission loss of the light signals in accordance with parallel positions of the output waveguides. A plurality of the sub-waveguides may cross at least with the output waveguides in the peripheral portion among a plurality of the output waveguides arranged in parallel. A plurality of the sub-waveguides may cross with the output waveguides in the center portion and the peripheral portion, respectively. The widths of a plurality of the sub-waveguides may be narrowed as going away from the slab waveguide. The number of the sub-waveguides crossing with the output waveguides in the peripheral portion may be decreased from the center portion towards the peripheral portion.

When the waveguide type optical splitter according to the present invention is used as a waveguide type optical module, the waveguide type optical module comprises a single input optical fiber and a plurality of output optical fibers, and a waveguide type optical splitter for multi-branching light signals transmitted from the input optical fiber for outputting them to a plurality of the output optical fibers, wherein the waveguide type optical splitter comprises:
a slab waveguide for multi-branching incident light signals;
a plurality of output waveguides being arranged in parallel with respect to the slab waveguide, to which the light signals being multi-branched are inputted, respectively; and
opening widths of the output waveguides to which the light signals are inputted, respectively, vary in accordance with arranged positions of a plurality of the output waveguides.

In the present invention as described above, the opening widths on the output waveguide side to which the light signals are inputted, respectively, vary in accordance with the disposing positions of a plurality of the output waveguides. Therefore, it enables to achieve the optical splitter with low loss and low polarization dependency by improving the uniformity of the losses in each output waveguide without increasing the excessive loss. In this manner as described above, by setting the opening widths of the output waveguide side so that the light intensities become uniform, it enables to improve the uniformity of the light intensities of the light signals inputted to each output waveguide and to achieve the optical splitter with the excellent optical properties.

Further, the pitch of the output waveguides and the opening width of the tapered waveguide are narrowed in the center portion where the light intensity is strong, while the pitch of the output waveguides and the opening width of the tapered waveguide are widened in the edge portion where the light intensity is weak. Thereby, it enables to achieve the optical splitter with low loss and low polarization dependency by improving the uniformity of the losses in each output waveguide without increasing the excessive loss in the star coupler. As described above, by setting the opening widths of the output waveguides of the star coupler so that the light intensities become uniform, it enables to improve the uniformity of the light intensities of the light signals inputted to each output waveguide and to achieve the optical splitter with the excellent optical properties.

Further, by widening the opening widths of a plurality of the tapered waveguides provided to a plurality of the output waveguides from the center portion towards the peripheral portion and, in addition, by disposing a plurality of the output waveguides by the small pitch in the center portion and large pitch in the peripheral portion, it is possible to dispose a required number of output waveguides in parallel on the output side of the slab waveguide while enabling to achieve the uniformity of the light losses between a plurality of the output waveguides. Further, by setting the opening widths of a plurality of the tapered waveguides which are provided to a plurality of the output waveguides narrower in the center portion and wider in the peripheral portion, the pitch of the output waveguides disposed closely can be maintained narrow so that the optical splitter can be reduced in size.

The waveguide width of the tapered waveguide becomes narrower as going away from the slab waveguide. In this case, by narrowing the waveguide widths of the tapered waveguides linearly, n-order-functionally, or exponentially, the length of the tapered waveguide can be set in a desired length.

Further, in the coupling section of the slab waveguide and the tapered waveguide or the output waveguide, a power loss (referred to as an "insertion loss" hereinafter) is generated due to dispersions of the light. Thus, the present invention comprises a plurality of sub-waveguides for decreasing the transmission loss of the light signals in accordance with the parallel positions of the output waveguides so as to improve the insertion loss by the sub-waveguides. Therefore, it is possible to reduce the insertion loss between a plurality of the output waveguides.

Further, the optical splitter according to the present invention has the excellent optical properties, which can improve the uniformity of the light intensities inputted from the slab waveguides to the output waveguides. Therefore, by applying the optical splitter according to the present invention to the optical module, the performance of the optical module can be improved.

BRIEF DESCRIPTION OF DRAWINGS

FIG. 5 is a plan view for showing a second embodiment of the waveguide type optical splitter according to the present invention, and FIG. 5 is a plan view for showing a third embodiment of the waveguide type optical splitter according to the present invention;

DESCRIPTION OF THE PREFERRED EMBODIMENTS

Figure 3:
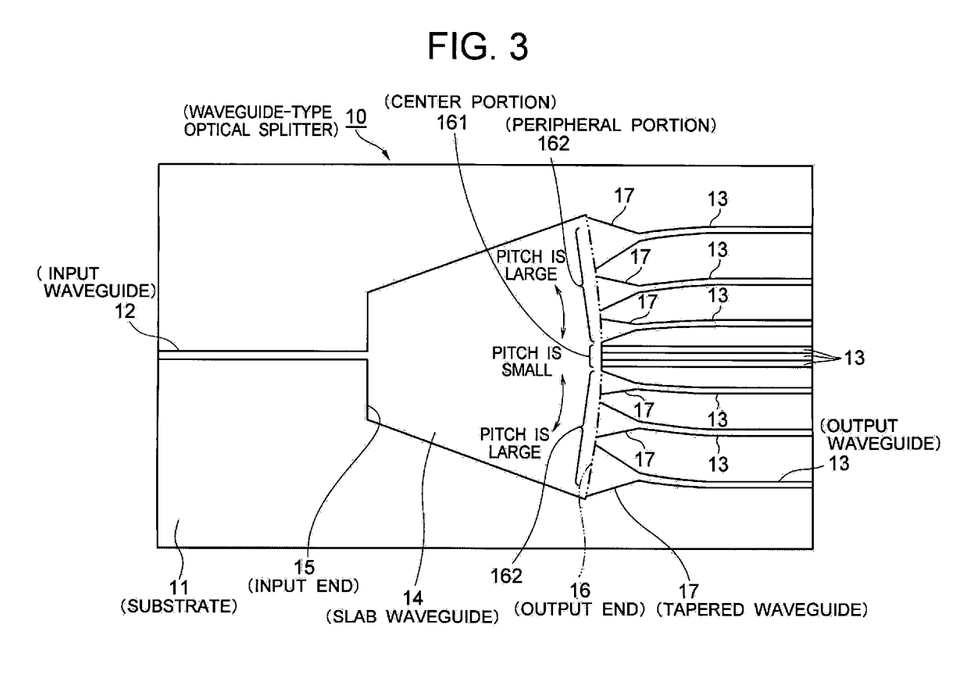
FIG. 3 is a plan view for showing a fist embodiment of a waveguide type optical splitter according to the present invention.
Figure 4:
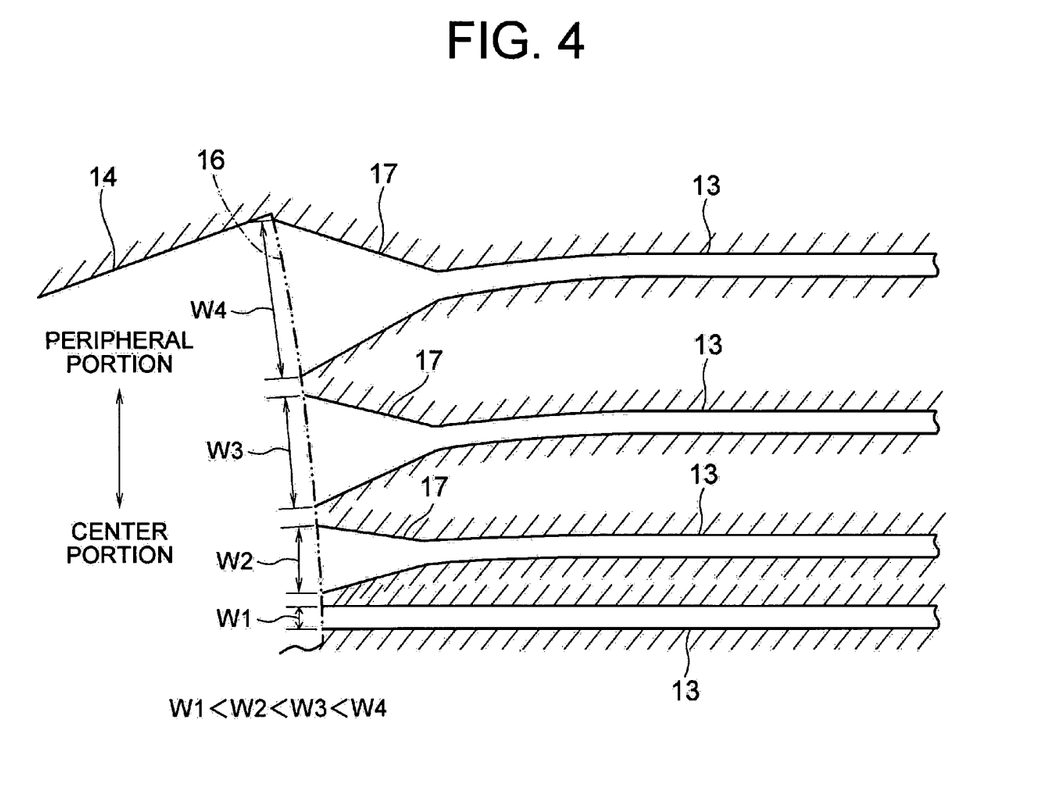
FIG. 4 is a fragmentary enlarged view of FIG. 3.
Figure 5:
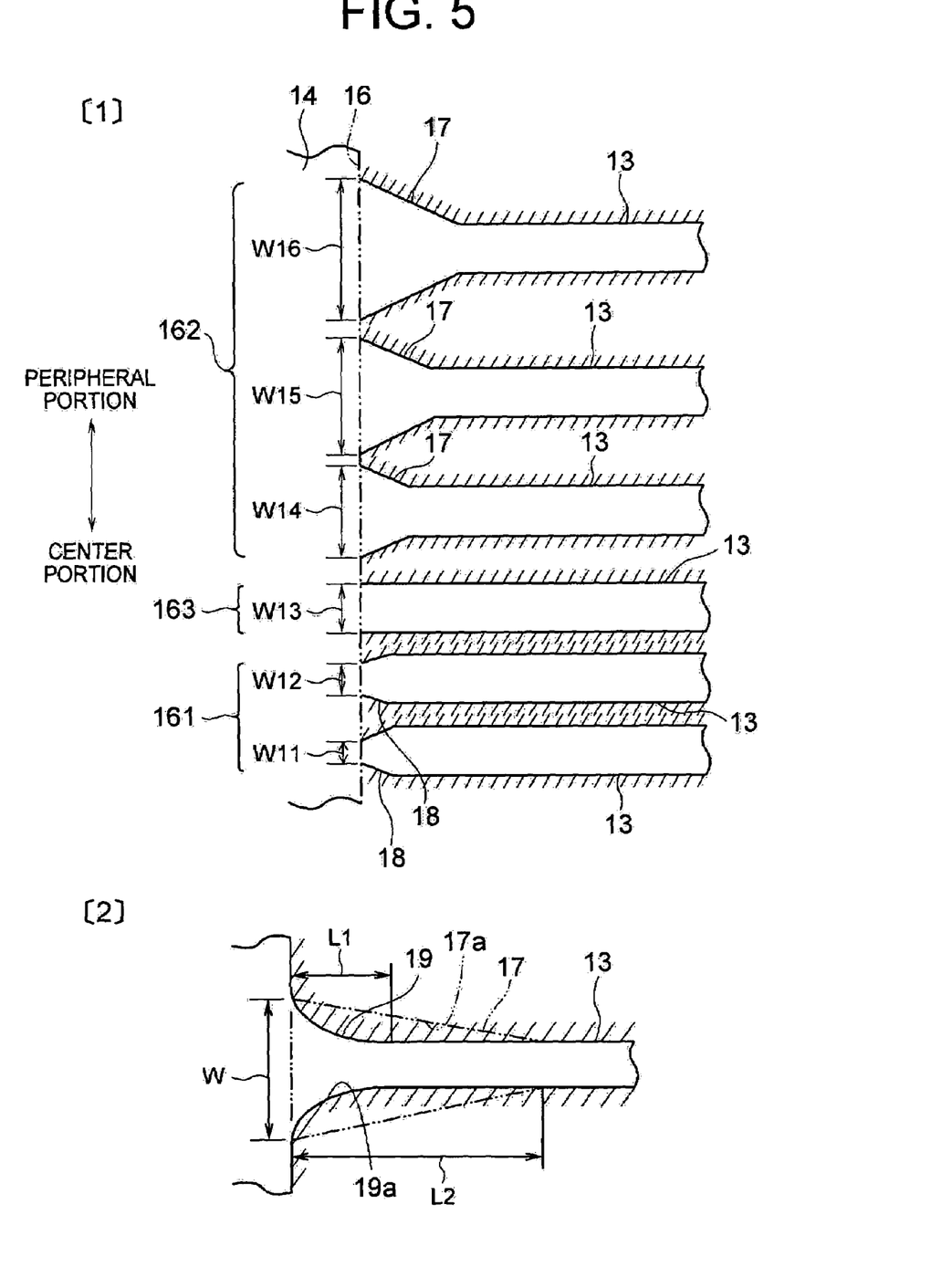

FIG. 3 is a plan view for showing a first embodiment of a waveguide type optical splitter according to the present invention. FIG. 4 is a fragmentary enlarged view of FIG. 3. Description will be provided hereinafter by referring to FIG. 3 and FIG. 4.

In a waveguide type optical splitter 10 of the embodiment, formed on a substrate 11 are an input waveguide 12, a plurality of output waveguides 13, and a slab waveguide 14 which multi-branches the light from the input waveguide 12 into a plurality of the output waveguides 13. The slab waveguide 14 comprises an input end 15 coupled to the input waveguide 12 and an output end 16 to which a plurality of the output waveguides 13 are coupled. A plurality of the output waveguides 13 are disposed in parallel on the output side of the slab waveguide 14.

The output end 16 of the slab waveguide 14 is formed in an arc shape with the input end 15 or the vicinity being the center, and a plurality of the output waveguides 13 are connected to the arc-shape output end 16. Since the output end 16 of the slab waveguide 14 is formed in an arc shape, the intensity of the light reaching the output end 16 through the slab waveguide 14 is the strongest in the center of the output end 16 and gradually weakens from the center towards the periphery.

Thus, in a center portion 161 of the output end 16 of the embodiment shown in FIG. 3, a plurality of output waveguides 13 are closely disposed and are directly connected to the output end 16 of the slab waveguide 14.

In a peripheral portion 162 of the output end 16, each of the output waveguides 13 comprises a tapered waveguide 17 at its end portion and the tapered waveguide 17 is coupled to the output end 16. The waveguide width of the tapered waveguide 17 is tapered from the output end 16 side towards the end portion side of the output waveguide 13, and he opening width (waveguide width) facing the output end 16 is set to be the widest.

The opening widths of the tapered waveguides 17 vary depending on the positions of the respective output waveguides 13 being coupled to the peripheral portion 162 of the output end 16. In the embodiment shown in FIG. 3, it is set to be in the relation expressed as W1<W2<W3<W4, provided that the opening width of the tapered waveguide 17 positioned in the center portion is W1, and the opening widths of the tapered waveguides 17 positioned from the center portion 161 towards the peripheral portion 162 are W2, W3, W4. That is, the opening widths of the tapered waveguides 17 are set to be widened from the center portion 161 towards the peripheral portion 162.

As described above, the opening widths of the tapered waveguides 17 vary in the center portion 161 and in the peripheral portion 162, so that the pitch of a plurality of the output waveguides 13 disposed in the peripheral portion are gradually widened in accordance with the amount of an increase in the opening width. Thus, a plurality of the output waveguides 13 in the peripheral portion are disposed by a large pitch.

In the embodiment, a silicon substrate is used for the substrate 11 and by forming, on the silicon substrate 11, a core layer to be the waveguides and a clad layer for being other than the waveguides using micro-processing techniques such as CVD, photolithography, and RIE. Thereby, the input waveguide 12, the slab waveguides 14 and the output waveguides 13 are provided to the silicon substrate 11. To the input waveguide 12 and the output waveguide 13, an input optical fiber and an output optical fiber (which are not shown) are connected, respectively.

The light signal from the optical fiber makes incidence to the slab waveguide 14 after propagating through the input waveguide 12. The width of the input end 15 of the slab waveguide 14 is sufficiently wider than the width of the input waveguide 12 and also the width of the waveguide is widened in a fan shape (tapered shape) from the input end 15 towards the output end 16. Thus, the width of the slab waveguide 14 is set to be sufficiently large to such an extent that the light spread by the diffraction does not emitted to the boundary. Therefore, within the slab waveguide 14, the signal light is not shut in the horizontal direction so that the signal light spreads in a tapered shape in the slab waveguide 14 and travels towards the output end 16 side.

Further, the center curvature of the light wave surface spread by the diffraction from the input end 15 of the slab waveguide 14 is known to be on the inner side (the input waveguide 12 side) than the input end 15 side. Therefore, the center curvature of the fan shape in which the width of the slab waveguide 14 is spread is shifted from the input end 15 side towards the input waveguide 12 side by an order of some μm to some tens of μm. The positions and shapes (the opening width on the output end 16 side) of each tapered waveguide 17 are set to be in a prescribed branching ratio. Further, the taper angle of the tapered waveguide 17 is set to be as small as possible so as to suppress the radiation loss of the light in accordance with the reduction of the waveguide width. There are eight output waveguides 13 illustrated in the drawing, however, needless to say, the number is not limited to this.

Next, the functions and effects of the waveguide type optical splitter 10 will be described.

The light made incident from the input waveguide 12 to the slab waveguide 14 spreads in a fan shape with the input end 15 or the vicinity being the center by the diffraction effect and reaches the arc shaped output end 16. The intensities of the light reaching the output end 16 exhibit Gaussian distribution which decreases from the center of the output end 16 towards the periphery. The light reaching the output end 16 makes an incident directly to the output waveguide 13 in the center portion 161 of the output end 16 and makes an incident to the output waveguide 13 in the peripheral portion 162 of the output end 16 through the tapered waveguide 17. Thereby, there is no tapered waveguide 17 in the output waveguide 13 in the center portion 161 where the light intensity is strong so that only the necessary light is concentrated, while a large quantity of light is concentrated in the output waveguide 13 in the peripheral portion 162 where the light intensity is weak since the tapered waveguide 17 is provided. Thereby, it is possible to achieve the uniformity of the losses between the output waveguides 13. Also, the opening widths of the tapered waveguides 17 are widened towards the periphery.

That is, since the opening widths W1 to W4 correspond to the Gaussian distribution of the light intensity in the output end 16, it enables to further achieve the uniformity of the losses between the output waveguides 13.

In the embodiment, the tapered waveguide 17 is not provided to the center portion 161 of the output end 16. Thus, even if the opening width of the tapered waveguide 17 in the peripheral portion 162 of the output end 16 is formed narrower than that of the conventional art, it is possible to achieve the uniformity of the losses between the output waveguides 13. As a result, it enables to achieve both high-density output waveguides 13 and to achieve the uniformity of the losses between the output waveguides 13.

Further, the output waveguides 13 are disposed by the small pitch in the center portion 161 of the output end 16 and by the large pitch in the peripheral portion 162 of the output end 16. Since the light intensity is strong in the center portion 161 of the output end 16, it is not necessary to provide the tapered waveguides 17 in the end of the output waveguides 13. Thus, high-density is achieved by disposing a plurality of the output waveguides 13 by the small pitch.

In the meantime, at the peripheral portion 162 of the output end 16, the light intensities are made uniform by making the light intensity in the peripheral portion 162 of the output end 16 approximate to the light intensity in the center portion 162 through disposing a plurality of the output waveguides 13 by the large pitch, by providing the tapered waveguide 17 with a necessary opening width to the output waveguide 13, and by correcting the light intensity of the tapered waveguide 17.

As described above, by changing the pitch of the output waveguides 13 in accordance with the Gaussian distribution of the light intensity of the output end 16, it enables to achieve better uniformity of the losses between the output waveguides 13.

FIG. 5 is a fragmentary plan view for showing a second embodiment of the waveguide optical splitter according to the present invention. However, description will be provided hereinafter by referring to FIG. 5. Descriptions of the same components as those of FIG. 3 are omitted by applying the same reference numerals or by omitting illustrations.

In FIG. 5, although the output end 16 is illustrated linearly, it is formed in an arc shape as shown in FIG. 3 and FIG. 4.

In the embodiment shown in FIG. 5, the region of the arc-shape output end 16 of the slab waveguide 14 is divided into three regions of the center portion 161, the middle portion 163, and the peripheral portion 162 along the arc and the output waveguides 13 are coupled to the slab waveguide 14. It will be described more specifically in the followings.

As shown in FIG. 5, a tapered waveguide 18 is provided to the end of the output waveguide 13 which is coupled to the center portion 161 of the output end 16. The opening width of the tapered waveguide 18 of the output waveguide 13 is widened in a tapered shape from the output end 16 of the slab waveguide 14 side towards the output waveguide 13 side. The end portion of the narrowest opening width of the tapered waveguide 18 is coupled to the output end 16 of the slab waveguide 14 and the end portion of the widest opening width is coupled to the output waveguide 13. Further, the opening widths W11, W12 of the tapered waveguides 18 are narrowed as approaching the center portion 161 side. The relation of the opening widths of the tapered waveguides 18 can be expressed as W11<W12.

In the middle portion 163 of the output end 16, the output waveguide 13 is directly coupled to the middle portion 163 of the output end 16.

In the peripheral portion 162 of the output end 16, as in the embodiment shown in FIG. 3, the opening widths of the tapered waveguides 17 are varied according to the positions of each output waveguide 13 to be coupled to the peripheral portion 162 of the output end 16. In FIG. 5, the relation between the opening widths are set to be W14<W15<W16, provided that the opening width of the tapered waveguide 17 disposed near the middle portion 163 side is W14, the opening widths of the tapered waveguides 17 disposed farther are W15, W16. That is, the opening widths of the tapered waveguides 17 positioned in the peripheral portion 162 are set to become wider as going towards the peripheral portion 162.

As described above, in the embodiment shown in FIG. 5, the openings W11, W12 of the tapered waveguides 18 towards the center portion 161 are set to be narrow and the opening widths W14, W15, W16 of the tapered waveguides 17 are gradually widened towards the peripheral portion 162 with the opening width W13 of the output waveguide 13 in the middle portion 163 being the reference. The relation between the opening widths can be expressed as W11<W12<W13<W14<W15<W16.

In the embodiment, the light can be downed by the tapered waveguide 18 in the output waveguide 13 in the center portion 161. Thus, even if the opening width of the tapered waveguide 17 in the peripheral portion 162 is narrowed compared to the first embodiment in accordance with the downed light, it is possible to achieve the uniformity of the losses between the output waveguides 13. Therefore, it enables to achieve both the high-density output waveguide 13 and the uniformity of the insertion losses between the output waveguides 13.

In the embodiment, there are three kinds as a plurality of the output waveguides 13; the one with no tapered waveguide, another with a tapered waveguides 17, and the other with the tapered waveguide 18. However the output waveguides 13 are not limited to these types. As a plurality of the output waveguides 13, the ones with two types of the tapered waveguides 17, 18 may be used. In this case, the insertion losses generated between the output waveguides 13 can be made uniform by dividing the region of the output end 16 of the slab waveguide 14 into two regions, widening the opening widths of the tapered waveguides 17 towards the peripheral portion of the output end 16, and narrowing the opening widths of the tapered waveguides 18 as approaching to the center portion 161.

FIG. 5 is a fragmentary plan view for showing a third embodiment of the waveguide type optical splitter according to the present invention. Description will be provided hereinafter by referring to FIG. 5. However, descriptions of the same components as those of FIG. 3 are omitted by applying the same reference numerals or by omitting illustrations.

The embodiment regards to a tapered waveguide 19 inserted between the slab waveguide 14 and the output waveguide 13. As for the tapered waveguide 17 of the above-described embodiment, as shown by an alternate two-dot chain line in FIG. 5, the wall face which defines the waveguide is formed linearly (tapered shape) so as to change the waveguide width. In the meantime, in the tapered waveguide 19, the wall face which defines the waveguide is formed in a curved shape so as to change the waveguide width. The inner wall of the tapered waveguide 19 is curved by projecting towards the inner side. In this case, it is desirable that the curved shape of the inner wall be in an exponential-functional shape or N-functional shape. The "n" is an integer of 2 or larger.

This structure may be applied to the tapered waveguides 17 and 18.

With the embodiment, it is possible to shorten the length L1 of the tapered waveguide 19 in the optical axis direction (lateral direction in the drawing) while suppressing the radiation loss of the light which is caused in accordance with the reduction of the waveguide widths of the tapered waveguide. Thus, the size reduction can be achieved. As a description provided by referring to the values, if the width of the output waveguide 13 is 7 μm and the opening width W is 20 μm, 500 μm is required for the length L2 in the tapered waveguide 17 in the tapered shape, while only 200 μm is required for the length L1 in the tapered waveguide 19 of the embodiment.

In FIG. 1 to FIG. 3, the horizontal direction (the length direction of the waveguide) is being shortened with respect to the vertical direction (the width direction of the waveguide) for better understanding.

Figure 6:
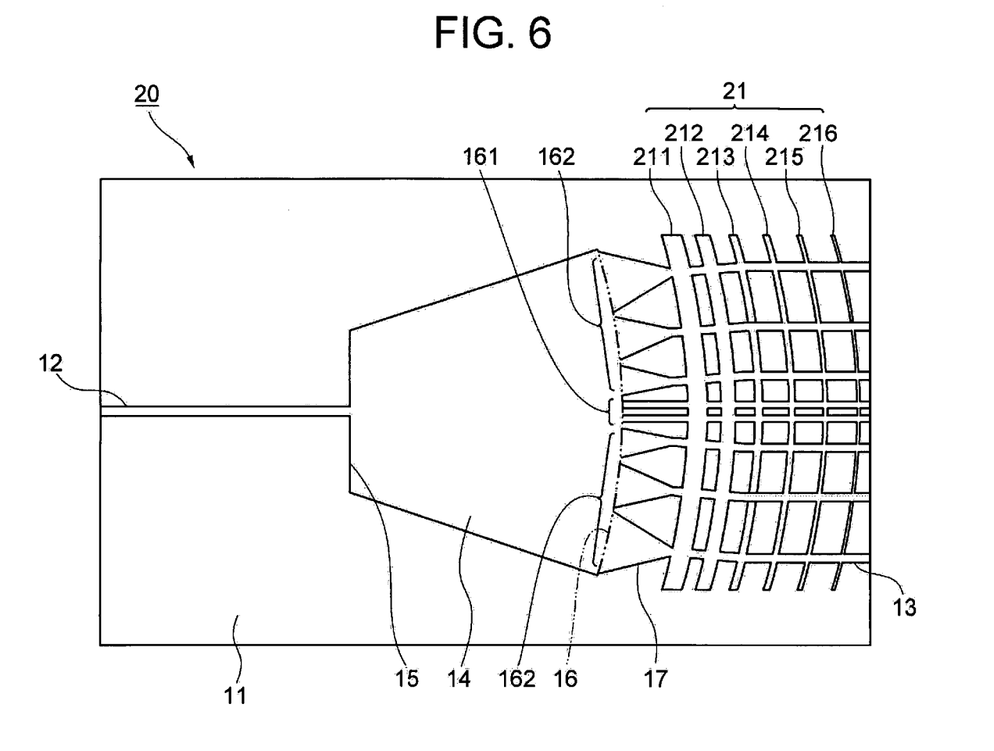
FIG. 6 is a plan view for showing a fourth embodiment of the waveguide type optical splitter according to the present invention.

FIG. 6 is a plan view for showing a fourth embodiment of the waveguide type optical splitter according to the present invention. Description will be provided by referring to the drawing. However, description of the same components as those of FIG. 3 will be omitted by applying the same reference numerals.

In a waveguide type optical splitter 20 of the embodiment, a plurality of loss-decreasing waveguides 211–216 crossing with a plurality of the output waveguides 13 are provided. The loss-decreasing waveguides 211–216 are formed on the substrate 11 simultaneously with other waveguides, thereby forming a conversion region 21. Further, the loss-decreasing waveguides 211–216 are formed in an arc shape as a concentric circle with the output end 16, and the waveguide widths are narrowed as going away from the output end 16. Although the number of the loss-decreasing waveguides 211, - - - , are set as six for convenience's sake, practically, the number is preferable to be twenty to forty.

In the conversion region 21, a plurality of the output waveguides 13 and a plurality of loss-decreasing waveguides 211–216 are formed in a mesh-like form. At this time, by gradually changing the widths and pitches of the loss-decreasing waveguides 211–216, the light propagating between a plurality of the output waveguides 13 can effectively make incidence to the output waveguides 13. Thereby, the insertion loss can be decreased.

By providing no tapered waveguide 17 to the output waveguide 13 disposed in the center portion 161 of the output end 16 of the slab waveguide 14, the uniformity of the insertion losses between the output waveguides 13 can be achieved. In such configuration, the light intensities of all the output waveguides 13 tend to become weak. Thus, as shown in FIG. 6, by providing the loss-decreasing waveguides 211, - - - , the light intensities of all the output waveguides 13 can be improved.

Figure 7:
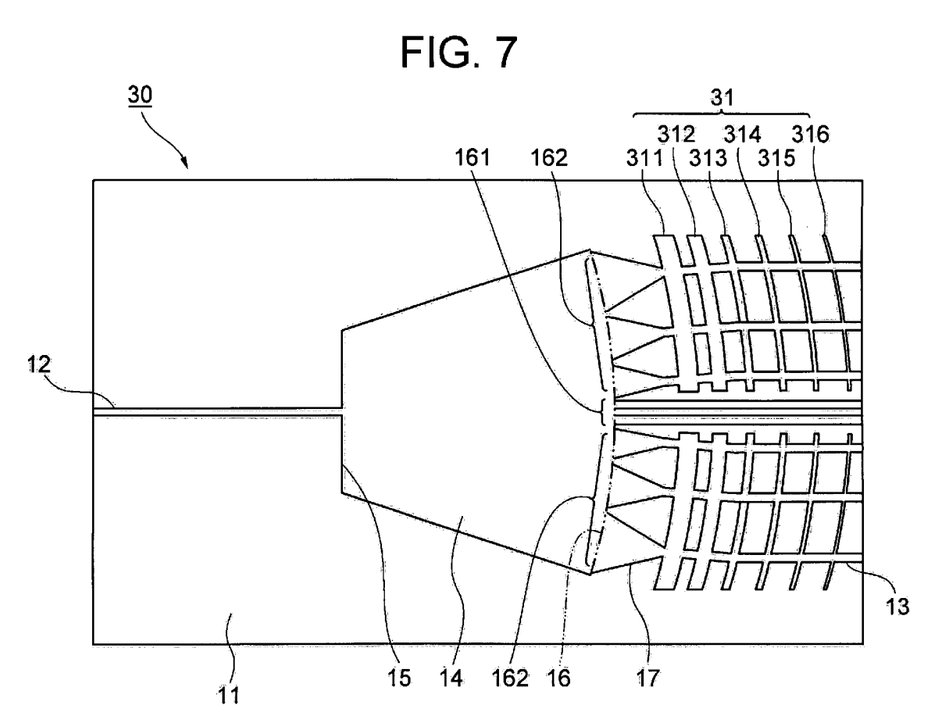
FIG. 7 is plan view for showing a fifth embodiment of the waveguide type optical splitter according to the present invention.

FIG. 7 is a plan view for showing a fifth embodiment of the waveguide type optical splitter according to the present invention. Description will be provided by referring to the drawing. However, description of the same components as those of FIG. 6 will be omitted by applying the same reference numerals.

Among the output waveguides 13 provided to the waveguide type optical splitter 30, a plurality of loss-decreasing waveguides 313–316 of the embodiment are provided by crossing only to the output waveguides 13 which comprise the tapered waveguide 17 being positioned in the peripheral portion 162 of the output end 16 of the slab waveguide 14. Thus, the loss-decreasing waveguides 313–316 do not cross with the output waveguides 13 comprising no tapered waveguide 17, which is positioned in the center portion 161 of the output end 16 of the slab waveguide 14.

The loss-decreasing waveguides 311–316 are formed on the substrate 11 simultaneously with other waveguides, thereby forming a conversion region 31. Further, the loss-decreasing waveguides 311–316 are formed in an arc shape as a concentric circle with the output end 16, and the waveguide widths are narrowed as going away from the output end 16.

Thereby, in the conversion region 31, the extent of decrease in the loss is increased as going away from the center of the output end 16 towards the periphery.

In the embodiment, even if the opening widths of the tapered waveguides 17 are formed narrower than those of the fourth embodiment, it enables to achieve the uniformity of the losses between the output waveguides 13 by the effect of the loss-decreasing waveguides 311, - - - . Therefore, it is possible to achieve both the high-density output waveguides 13 and the uniformity of the losses between the output waveguides 13.

Figure 8:
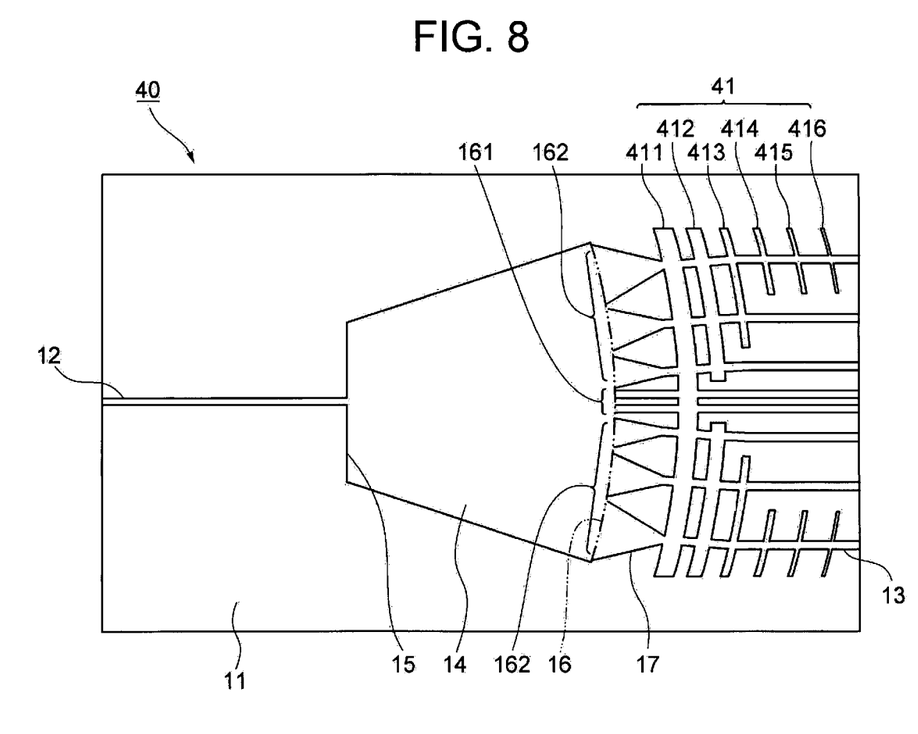
FIG. 8 is plan view for showing a sixth embodiment of the waveguide type optical splitter according to the present invention.

FIG. 8 is a plan view for showing a sixth embodiment of the waveguide type optical splitter according to the present invention. Description will be provided by referring to the drawing. However, description of the same components as those of FIG. 6 will be omitted by applying the same reference numerals.

In a waveguide type optical splitter 40 of the embodiment, a plurality of loss-decreasing waveguides 411–416 are provided by crossing with a plurality of the output waveguides 13 comprising the tapered waveguides 17. The loss-decreasing waveguides 411–416 are formed on the substrate 11 simultaneously with other waveguides, thereby forming a conversion region 41. Further, the loss-decreasing waveguides 411–416 are formed in an arc shape as a concentric circle with the output end 16, and the waveguide widths are narrowed as going away from the output end 16.

It is distinctive from the fourth embodiment in respect that the number of a plurality of the loss-decreasing waveguides 311, - - - decreases as approaching the center from the periphery of the output end 16. Thereby, in the conversion region 41, the extent of decrease in the losses can be increased as going away from the center of the output end 16 towards the periphery.

With the embodiment, even if the opening widths of the tapered waveguides 17 are formed narrower than those of the fourth embodiment, the uniformity of the losses between the output waveguides 13 can be achieved by the effect of the loss-decreasing waveguides 411, - - - . Therefore, it enables to further achieve both the high-density output waveguides 13 and the uniformity of the losses between the output waveguides 13.

Figure 9:
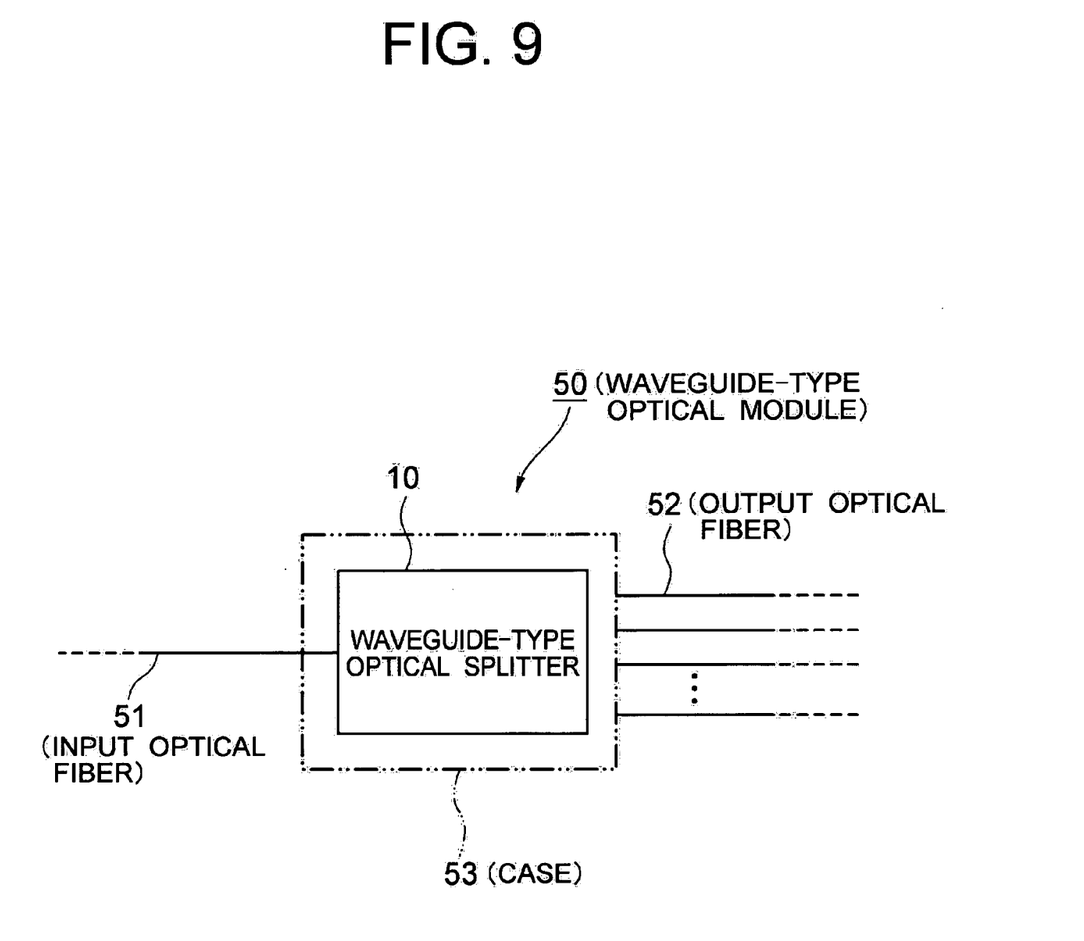
FIG. 9 is a schematic diagram for showing a first embodiment of the waveguide type optical module according to the present invention.

FIG. 9 is a schematic diagram for showing a first embodiment of the waveguide type optical module according to the present invention. Description will be provided by referring to the drawing. However, description of the same components as those of FIG. 3 will be omitted by applying the same reference numerals.

A waveguide type optical module 50 of the embodiment comprises the waveguide type optical splitter 10 shown in FIG. 3, an input optical fiber 51 connected to an input waveguide (not shown) of the waveguide type optical splitter 10, a plurality of output optical fibers 52 connected to the output waveguides (not shown) of the waveguide type optical splitter 10, and a case 53 for enclosing the waveguide type optical splitter 10, the input optical fiber 51, and the output optical fibers 52. In the waveguide type optical module 50, the waveguide type optical splitter 10 is provided, so that it can be reduced in size and also enables to obtain the output light with the uniform light intensities. Needless to say, the above-described waveguide type optical splitters 20, 30, 40 may be used instead of the waveguide type optical splitter 10.

What is claimed is:

1. A waveguide type optical splitter, comprising:
a slab waveguide for multi-branching incident light signals; and
a plurality of output waveguides being arranged in parallel with respect to the slab waveguide, to which the light signals being multi-branched are inputted, respectively, wherein
opening widths of the output waveguides to which the light signals are inputted, respectively, vary in accordance with arranged positions of a plurality of the output waveguides;
the opening width is narrower in a center portion where light intensity of the slab waveguide is strong and becomes wider from the center portion towards a peripheral portion; and
waveguide widths of tapered waveguides in the center portion are narrower on the slab waveguide side than the output waveguide side.

* * * * *